(12) United States Patent
Johnson et al.

(10) Patent No.: US 10,019,015 B2
(45) Date of Patent: Jul. 10, 2018

(54) ROBOTIC NAVIGATION UTILIZING SEMANTIC MAPPING

(71) Applicant: Locus Robotics Corp., Wilmington, MA (US)

(72) Inventors: Michael Charles Johnson, Ashland, MA (US); Bradley Powers, Lowell, MA (US); Bruce Welty, Boston, MA (US); Sean Johnson, Danvers, MA (US)

(73) Assignee: Locus Robotics Corp., Wilmington, MA (US)

( * ) Notice: Subject to any disclaimer, the term of this patent is extended or adjusted under 35 U.S.C. 154(b) by 0 days.

(21) Appl. No.: 15/608,543

(22) Filed: May 30, 2017

(65) Prior Publication Data

US 2017/0261992 A1   Sep. 14, 2017

Related U.S. Application Data

(63) Continuation of application No. 14/815,246, filed on Jul. 31, 2015.

(51) Int. Cl.
*G05D 1/02* (2006.01)
*B25J 5/00* (2006.01)
*B25J 11/00* (2006.01)

(52) U.S. Cl.
CPC .......... *G05D 1/0246* (2013.01); *B25J 5/007* (2013.01); *B25J 11/008* (2013.01); *G05D 1/0276* (2013.01); *G05D 2201/0211* (2013.01)

(58) Field of Classification Search
USPC ......................................................... 700/216
See application file for complete search history.

(56) References Cited

U.S. PATENT DOCUMENTS

| | | | |
|---|---|---|---|
| 2012/0191272 A1* | 7/2012 | Andersen | G06Q 10/087 701/2 |
| 2013/0204430 A1* | 8/2013 | Davey | G06F 19/3456 700/216 |
| 2013/0317642 A1* | 11/2013 | Asaria | G06O 50/28 700/216 |
| 2014/0277691 A1* | 9/2014 | Jacobus | G06Q 10/087 700/216 |

* cited by examiner

*Primary Examiner* — Kyle O Logan
(74) *Attorney, Agent, or Firm* — Verrill Dana, LLP; John W. Powell

(57) ABSTRACT

A method for performing tasks on items located in a space using a robot, the items being located proximate fiducial markers, each fiducial marker having a fiducial identification. The method includes receiving an order to perform a task on at least one item and determining the fiducial identification associated with the at least one item. The method also includes obtaining, using the fiducial identification of the at least one item, a set of coordinates representing a position of the fiducial marker with the determined fiducial identification, in a coordinate system defined by the space. The method further includes navigating the robot to the coordinates of the fiducial marker associated with said determined fiducial identification.

16 Claims, 8 Drawing Sheets

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| Location | Fiducial ID |
|---|---|
| L01001A | 11 |
| L01001B | 11 |
| L01001C | 11 |
| L01001D | 11 |
| L01001E | 11 |
| L01001F | 11 |
| L01002A | 12 |
| L01002B | 12 |
| L01002C | 12 |
| L01002D | 12 |
| L01002E | 12 |
| L01003A | 13 |
| L01003B | 13 |
| L01003C | 13 |
| L01003D | 13 |
| L01003E | 13 |
| L01003F | 13 |
| L01004A | 14 |
| L01004B | 14 |
| L01004C | 14 |
| L01004D | 14 |
| L01004E | 14 |
| L01005A | 15 |
| L01005B | 15 |
| L01005C | 15 |
| L01005D | 15 |
| L01005E | 15 |
| L01005F | 15 |

FIG. 7

ROBOTIC NAVIGATION UTILIZING SEMANTIC MAPPING

CROSS-REFERENCE TO RELATED APPLICATION

This application is a continuation of and claims priority to U.S. patent application Ser. No. 14/815,246 filed Jul. 31, 2015, and entitled "ROBOTIC NAVIGATION UTILIZING SEMANTIC MAPPING", which is herein incorporated by reference in its entirety.

RELATED APPLICATIONS

This application is related to U.S. patent application Ser. No. 14/815,110, titled "Operator Identification and Performance Tracking", filed concurrently with this application, incorporated herein by reference.

FIELD OF INVENTION

This invention relates to robotic navigation using semantic mapping and more particularly to robotic navigation using semantic mapping to navigate robots throughout a warehouse in robot-assisted product order-fulfillment systems.

BACKGROUND

Ordering products over the internet for home delivery is an extremely popular way of shopping. Fulfilling such orders in a timely, accurate and efficient manner is logistically challenging to say the least. Clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address. An important goal of the order-fulfillment process is thus to ship as many items in as short a time as possible.

The order-fulfillment process typically takes place in a large warehouse that contains many products, including those listed in the order. Among the tasks of order fulfillment is therefore that of traversing the warehouse to find and collect the various items listed in an order. In addition, the products that will ultimately be shipped first need to be received in the warehouse and stored or "placed" in storage bins in an orderly fashion throughout the warehouse so they can be readily retrieved for shipping.

In a large warehouse, the goods that are being delivered and ordered can be stored in the warehouse very far apart from each other and dispersed among a great number of other goods. With an order-fulfillment process using only human operators to place and pick the goods requires the operators to do a great deal of walking and can be inefficient and time consuming. Since the efficiency of the fulfillment process is a function of the number of items shipped per unit time, increasing time reduces efficiency.

Robot assisted order-fulfillment systems have been used to increase efficiency and productivity. However, there is still a need to further increase efficiency in such systems.

SUMMARY

In one aspect, the invention features a method for performing tasks on items located in a space using a robot, the items being located proximate fiducial markers, each fiducial marker having a fiducial identification. The method comprises receiving an order to perform a task on at least one item and determining the fiducial identification associated with the at least one item. The method also includes obtaining, using the fiducial identification of the at least one item, a set of coordinates representing a position of the fiducial marker with the determined fiducial identification, in a coordinate system defined by the space, The method further includes navigating the robot to the coordinates of the fiducial marker associated with said determined fiducial identification.

In other aspects of the invention one or more of the following features may be included. The method may further include communicating with a human operator to perform the task on the at least one item, wherein the task includes one of retrieving the at least one item and placing it on the robot or removing the at least one item from the robot and storing it proximate the fiducial marker. The space may be a warehouse containing a plurality of items stored in a plurality of containers dispersed throughout the warehouse. Each fiducial marker may be associated with and located proximate to one or more of the containers. The step of determining the fiducial identification may include establishing a fiducial identification system based on a physical layout of the containers dispersed throughout the warehouse and associating each container to a fiducial identification corresponding to the physical location of the container in the warehouse. The step of associating each container to a fiducial identification may further include linking the fiducial identification of the container to the items. The step of determining the set of coordinates representing a position of the fiducial marker with the determined fiducial identification may include correlating the determined fiducial identification with its corresponding fiducial marker and retrieving a set of coordinates representing the position of said fiducial marker in the coordinate system of the warehouse. Retrieving the set of coordinates representing the position of said fiducial marker may include determining a pose for the fiducial marker within the warehouse and the step of navigating may include propelling the robot to the pose without using intermediate fiducial markers to guide the robot to the fiducial marker correlated to the determined fiducial identification. The step of navigating may further include using a predetermined map of the warehouse including a pose for each fiducial marker to guide the robot to the fiducial marker.

In another aspect of this invention there is a robot configured to perform tasks on items located in a space, the items being located proximate fiducial markers, each fiducial marker having a fiducial identification. The robot includes a processor configured to determine a fiducial identification associated with at least one item on which the robot is to perform a task. The robot is further configured to obtain, using the fiducial identification of the at least one item, a set of coordinates representing a position of the fiducial marker with the determined fiducial identification, in a coordinate system defined by the space. There is a navigation system configured to navigate the robot to the coordinates of the fiducial marker associated with the determined fiducial identification.

In other aspects of the invention one or more of the following features may be included. The robot may include an interface device configured to communicate with a human operator to perform the task on the at least one item. The task may include one of retrieving the at least one item and placing it on the robot or removing the at least one item from the robot and storing it proximate the fiducial marker. The space may be a warehouse containing a plurality of items stored in a plurality of containers dispersed throughout the warehouse. Each fiducial marker may be associated with and located proximate to one or more of the containers. Each container in the warehouse may be associated to a fiducial identification corresponding to the physical location of the container in the warehouse. The fiducial identification of the container may be linked to the items stored in the containers. The processor may further be configured to correlate the determined fiducial identification with its corresponding fiducial marker and retrieve a set of coordinates representing the position of said fiducial marker in the coordinate system of the warehouse. The processor may further be configured to determine a pose for the fiducial marker within the warehouse and the navigation system may be configured to propel the robot to the pose without using intermediate fiducial markers to guide the robot to the fiducial marker correlated to the determined fiducial identification. The navigation system may include a map of the warehouse with a pose for each fiducial marker.

These and other features of the invention will be apparent from the following detailed description and the accompanying figures, in which:

BRIEF DESCRIPTION OF THE FIGURES

FIG. 6 is a table of the fiducial identification to pose mapping;

FIG. 7 is a table of the bin location to fiducial identification mapping; and

DETAILED DESCRIPTION

Figure 1:
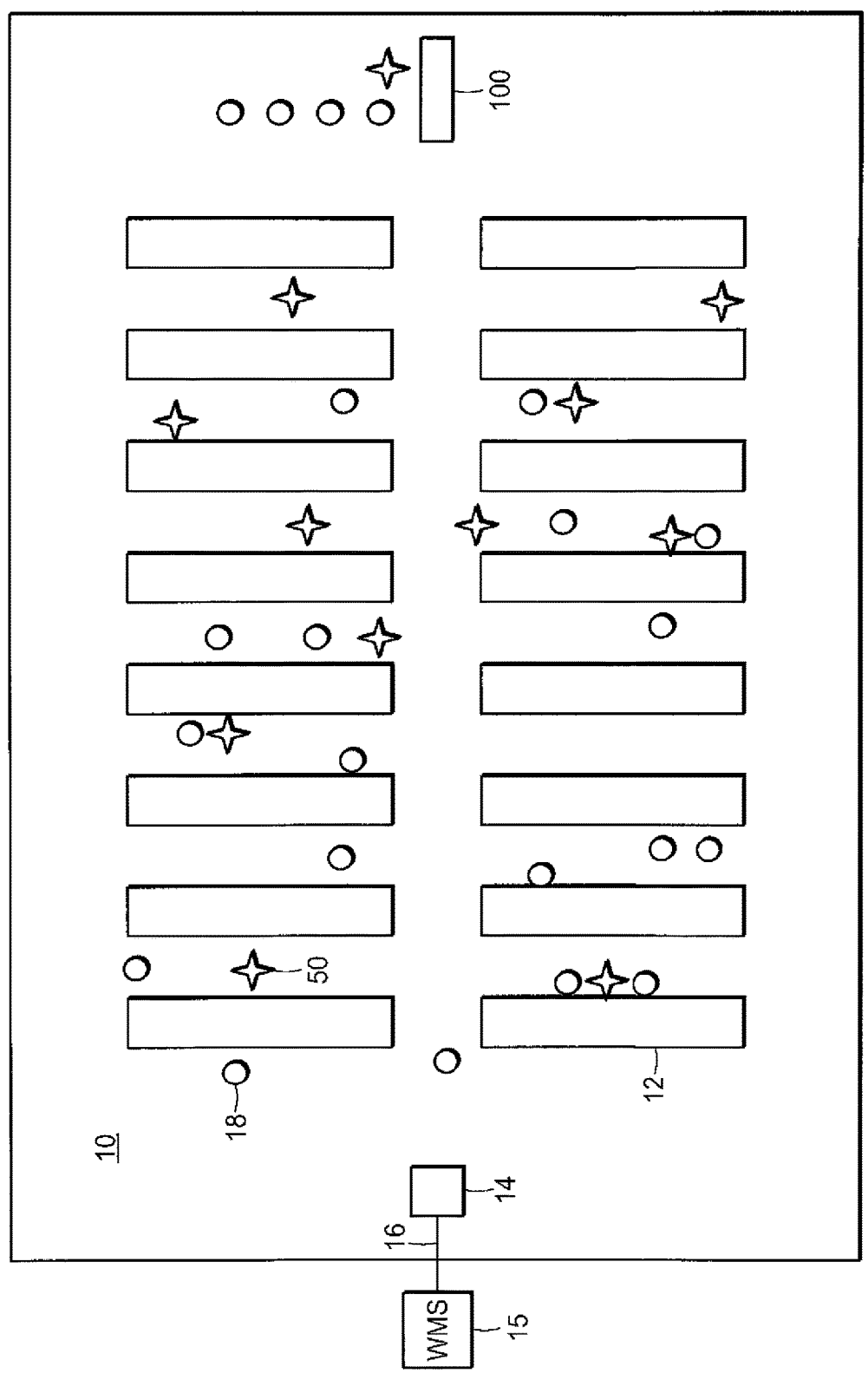
FIG. 1 is a top plan view of an order-fulfillment warehouse.

Referring to FIG. 1, a typical order-fulfillment warehouse 10 includes shelves 12 filled with the various items that could be included in an order 16. In operation, the order 16 from warehouse management server 15 arrives at an order-server 14. The order-server 14 communicates the order 16 to a robot 18 selected from a plurality of robots that roam the warehouse 10.

Figure 2:
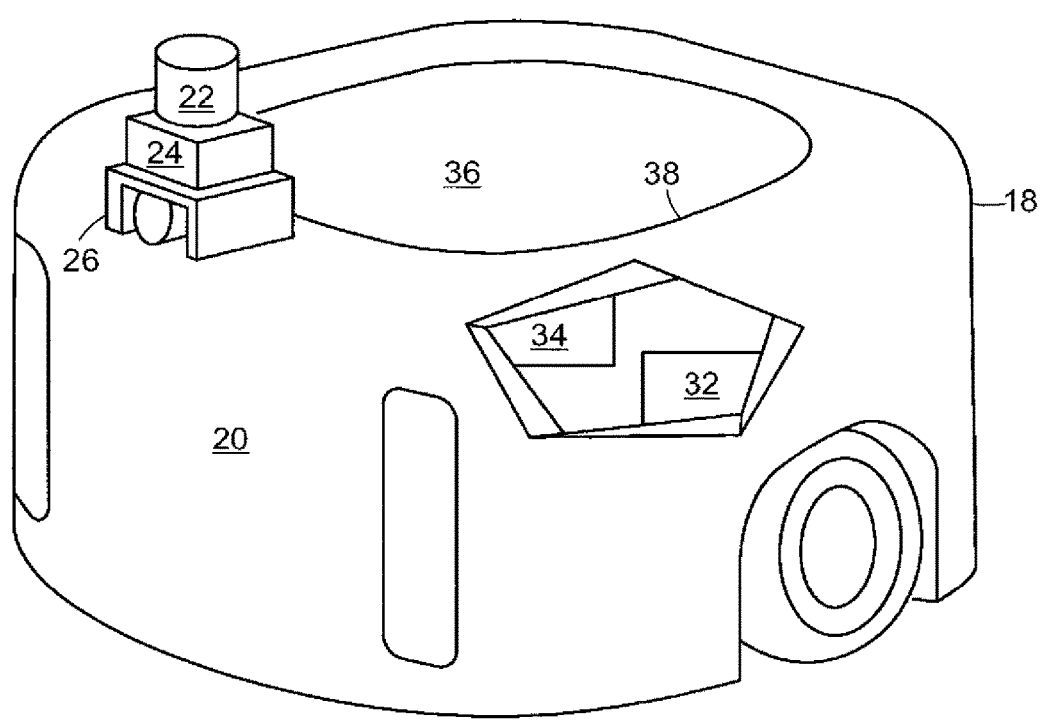
FIG. 2 is a perspective view of a base of one of the robots used in the warehouse shown in FIG. 1.
Figure 3:
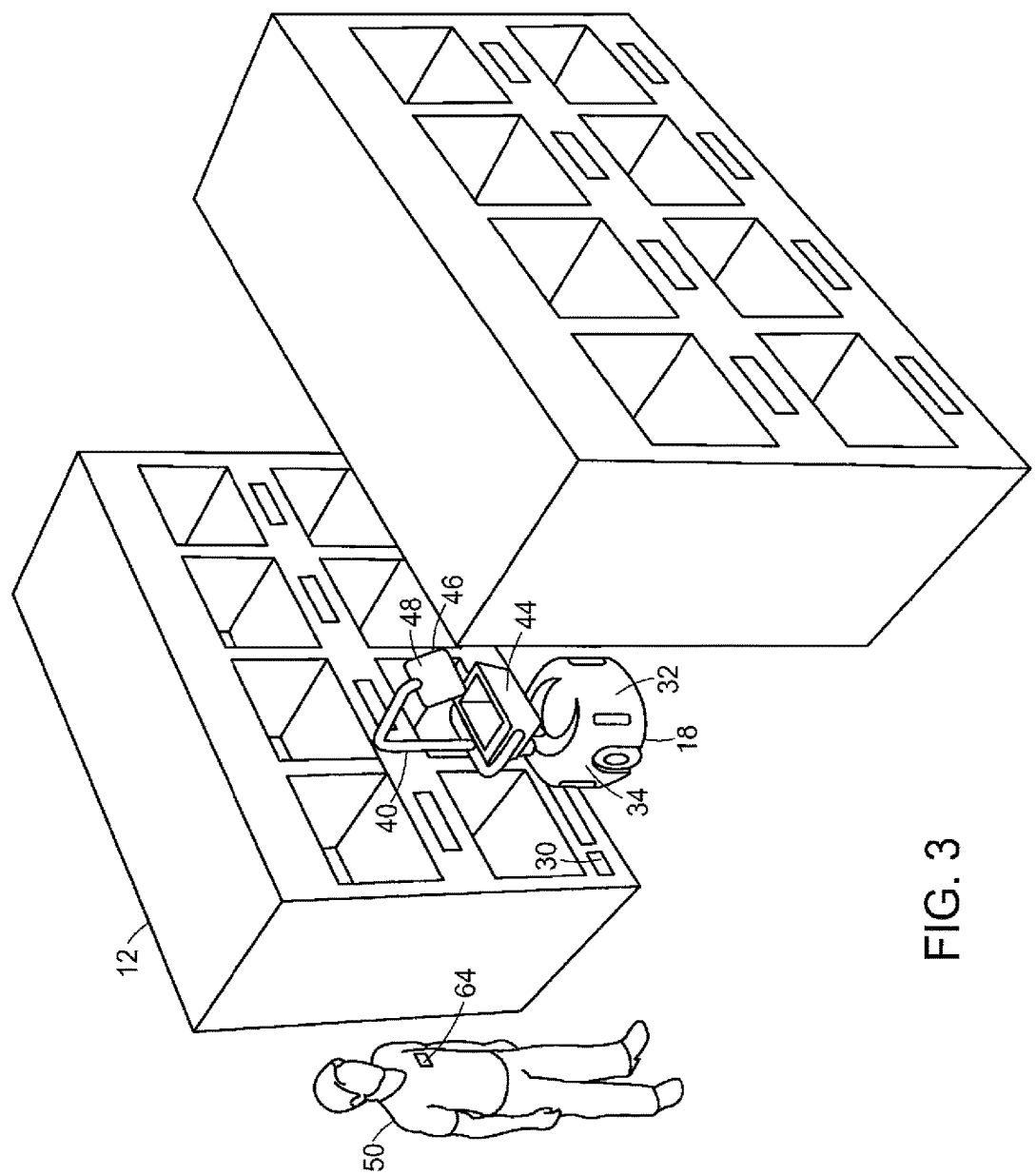
FIG. 3 is a perspective view of the robot in FIG. 2 outfitted with an armature and parked in front of a shelf shown in FIG. 1.

A typical robot 18, shown in FIG. 2, includes an autonomous wheeled base 20 having a laser-radar 22. The base 20 also features a transceiver 24 that enables the robot 18 to receive instructions from the order-server 14, and a camera 26. The base 20 also features a processor 32 that receives data from the laser-radar 22 and the camera 26 to capture information representative of the robot's environment and a memory 34 that cooperate to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8.

While the description provided herein is focused on picking items from bin locations in the warehouse to fulfill an order for shipment to a customer, the system is equally applicable to the storage or placing of items received into the warehouse in bin locations throughout the warehouse for later retrieval and shipment to a customer. The invention could also be utilized with other standard tasks associated with such a warehouse system, such as, consolidation of items, counting of items, verification, and inspection.

An upper surface 36 of the base 20 features a coupling 38 that engages any one of a plurality of interchangeable armatures 40, one of which is shown in FIG. 3. The particular armature 40 in FIG. 3 features a tote-holder 42 for carrying a tote 44 that receives items, and a tablet holder 46 for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Although a robot 18 excels at moving around the warehouse 10, with current robot technology, it is not very good at quickly and efficiently picking items from a shelf and placing them on the tote 44 due to the technical difficulties associated with robotic manipulation of objects. A more efficient way of picking items is to use a local operator 50, which is typically human, to carry out the task of physically removing an ordered item from a shelf 12 and placing it on robot 18, for example, in tote 44. The robot 18 communicates the order to the local operator 50 via the tablet 48, which the local operator 50 can read, or by transmitting the order to a handheld device used by the local operator 50.

Upon receiving an order 16 from the order server 14, the robot 18 proceeds to a first warehouse location, e.g. shown in FIG. 3. It does so based on navigation software stored in the memory 34 and carried out by the processor 32. The navigation software relies on data concerning the environment, as collected by the laser-radar 22, an internal table in memory 34 that identifies the fiducial identification ("ID") of fiducial marker 30 that corresponds to a location in the warehouse 10 where a particular item can be found, and the camera 26 to navigate.

Upon reaching the correct location, the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a packing station 100, FIG. 1, where they are packed and shipped.

It will be understood by those skilled in the art that each robot may be fulfilling one or more orders and each order may consist of one or more items. Typically, some form of route optimization software would be included to increase efficiency, but this is beyond the scope of this invention and is therefore not described herein.

In order to simplify the description of the invention, a single robot 18 and operator 50 are described. However, as is evident from FIG. 1, a typical fulfillment operation includes many robots and operators working among each other in the warehouse to fill a continuous stream of orders. In addition, certain robots and operators may be performing a placing or storage task to stock the warehouse with items or other tasks such as consolidation of items, counting of items, verification, and inspection.

The navigation approach of this invention, as well as the semantic mapping of a SKU of an item to be retrieved to a fiducial ID/pose associated with a fiducial marker in the warehouse where the item is located, is described in detail below with respect to FIGS. 4-8.

Using one or more robots 18, a map of the warehouse 10 must be created and the location of various fiducial markers dispersed throughout the warehouse must be determined. To do this, one of the robots 18 navigates the warehouse and builds a map 10a, FIG. 4, utilizing its laser-radar 22 and simultaneous localization and mapping (SLAM), which is a computational problem of constructing or updating a map of an unknown environment. Popular SLAM approximate solution methods include the particle filter and extended Kalman filter. The SLAM GMapping approach is the preferred approach, but any suitable SLAM approach can be used.

Robot 18 utilizes its laser-radar 22 to create map 10a of warehouse 10 as robot 18 travels throughout the space identifying, open space 112, walls 114, objects 116, and other static obstacles, such as shelf 12, in the space, based on the reflections it receives as the laser-radar scans the environment.

Figure 4:
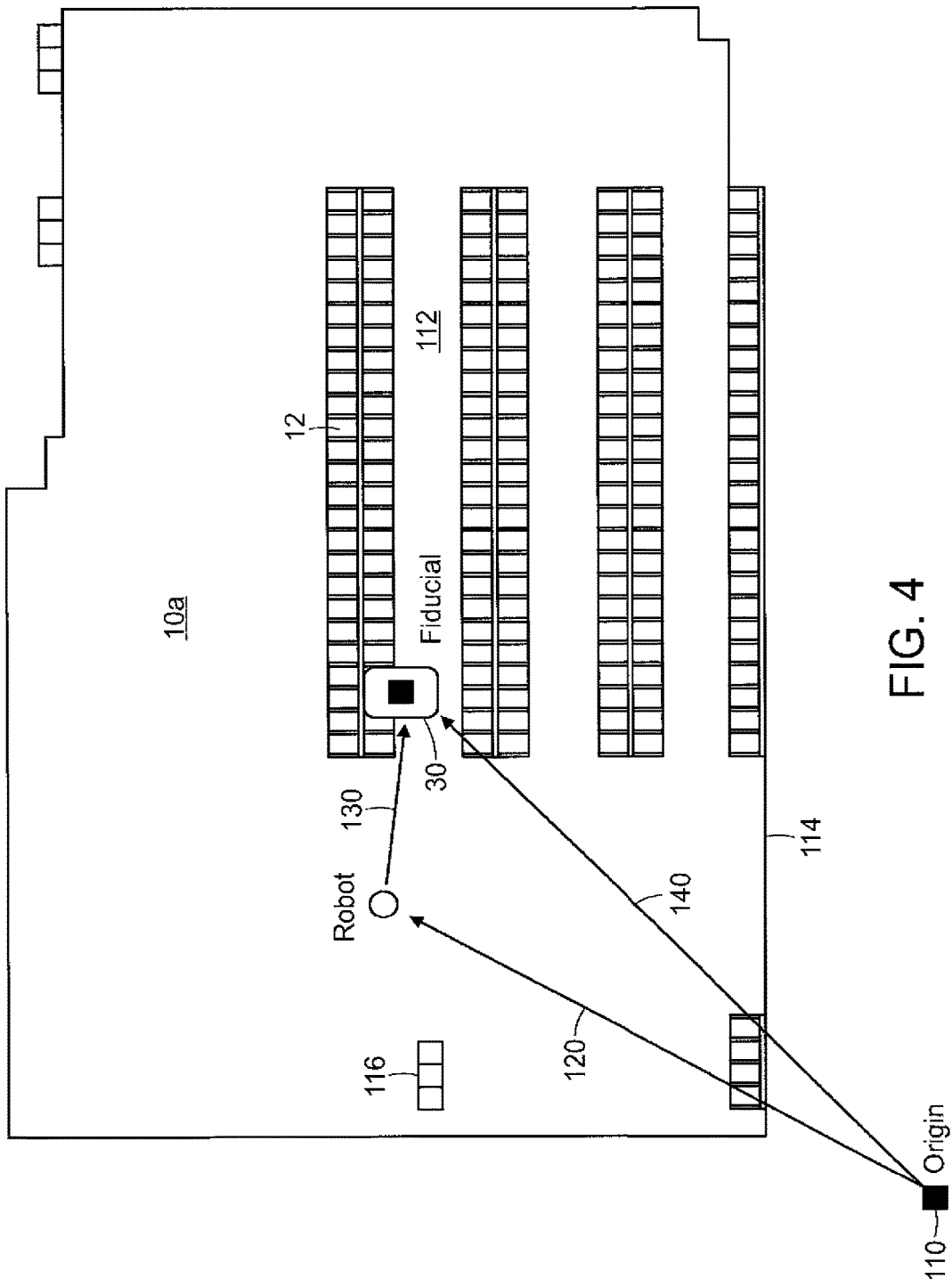
FIG. 4 is a partial map of the warehouse of FIG. 1 created using laser radar on the robot.

While constructing the map 10a or thereafter, one or more robots 18 navigates through warehouse 10 using camera 26 to scan the environment to locate fiducial markers (two-dimensional bar codes) dispersed throughout the warehouse on shelves proximate bins, such as 32 and 34, FIG. 3, in which items are stored. Robots 18 use a known starting point or origin for reference, such as origin 110. When a fiducial marker, such as fiducial marker 30, FIGS. 3 and 4, is located by robot 18 using its camera 26, the location in the warehouse relative to origin 110 is determined.

By the use of wheel encoders and heading sensors, vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose (position and orientation) defined by a quaternion (x, y, z, ω) for fiducial marker 30 can be determined.

Figure 5:
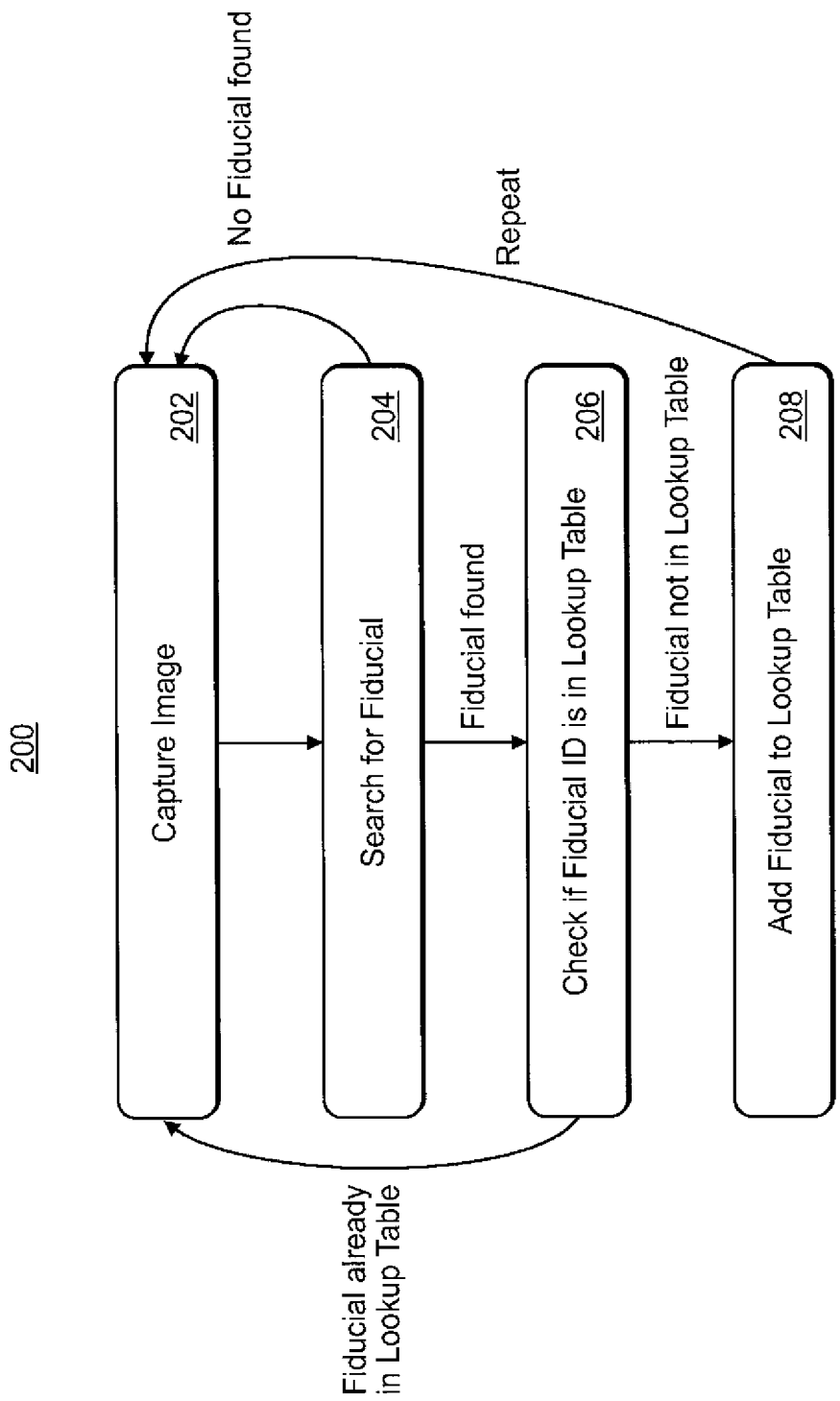
FIG. 5 is a flow chart depicting the process for locating fiducial markers dispersed throughout the warehouse and storing fiducial marker poses.

Flow chart 200, FIG. 5, describing the fiducial marker location process is described. This is performed in an initial mapping mode and as robot 18 encounters new fiducial markers in the warehouse while performing picking, placing and/or other tasks. In step 202, robot 18 using camera 26 captures image and in step 204 searches for fiducial markers within the captured images. In step 206, if a fiducial marker is found in the image (step 204) it is determined if the fiducial marker is already stored in fiducial table 300, FIG. 6, which is located in memory 34 of robot 18. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot, there are included for each fiducial marker a fiducial identification, 1, 2, 3, etc, and a pose for the fiducial marker/bar code associated with each fiducial identification. The pose consists of the x,y,z coordinates in the warehouse along with the orientation or the quaternion (x,y,z, ω).

In another look-up Table 400, FIG. 7, which may also be stored in the memory of each robot, is a listing of bin locations (e.g. 402a-f) within warehouse 10, which are correlated to particular fiducial ID's 404, e.g. number "11". The bin locations, in this example, consist of seven alpha-numeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial ID's, Robot 18 can determine the pose of the fiducial ID using the information in table 300, FIG. 6, and then navigate to the pose as described herein.

Figure 8:
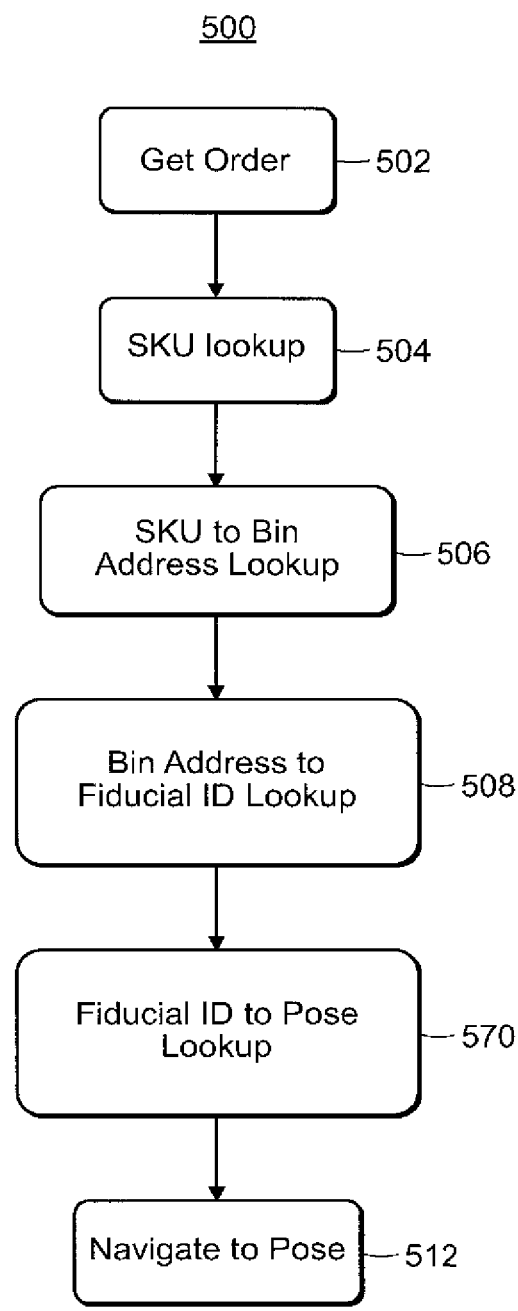
FIG. 8 is a flow chart depicting product SKU to pose mapping process.

The order fulfillment process according to this invention is depicted in flow chart 500, FIG. 8. In step 502, warehouse management system 15, FIG. 1, obtains an order, which may consist of one or more items to be retrieved. In step 504 the SKU number(s) of the items is/are determined by the warehouse management system 15, and from the SKU number(s), the bin location (s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 26, it determines if there are any obstacles in its path either fixed or dynamic, such as other robots 18 and/or operators 50 and iteratively updates its path to the pose of the fiducial marker. The robot re-plans its route about once every 50 milliseconds, constantly searching for the most efficient and effective path while avoiding obstacles.

With the product SKU/fiducial ID to fiducial pose mapping technique combined with the SLAM navigation technique both described herein, robots 18 are able to very efficiently and effectively navigate the warehouse space without having to use more complex navigation approaches typically used which involve grid lines and intermediate fiducial markers to determine location within the warehouse.

What is claimed is:

1. A method for performing tasks on items located in a space using a robot, the items being located proximate fiducial markers, each fiducial marker having a fiducial identification, the method comprising:

Receiving an order to perform a task on at least one item, the at least one item including a SKU;

Based on the SKU, determining the fiducial identification associated with the at least one item;

Obtaining, using the fiducial identification of the at least one item, a set of coordinates representing a position of the fiducial marker with the determined fiducial identification, in a coordinate system defined by the space;

Navigating the robot to the coordinates of the fiducial marker associated with said determined fiducial identification; and wherein obtaining the set of coordinates representing the position of said fiducial marker includes determining a pose for the fiducial marker within the warehouse and the step of navigating includes propelling the robot to the pose without using intermediate fiducial markers or the fiducial marker correlated to the determined fiducial identification to guide the robot to the pose.

2. The method of claim 1, further including communicating with a human operator to perform the task on the at least one item; wherein the task includes one of retrieving the at least one item and placing it on the robot or removing the at least one item from the robot and storing it proximate the fiducial marker.

3. The method of claim 1, wherein the space is a warehouse containing a plurality of items stored in a plurality of containers dispersed throughout the warehouse.

4. The method of claim 3, wherein each fiducial marker is associated with and located proximate to one or more of the containers.

5. The method of claim 4, wherein the step of determining the fiducial identification includes establishing a fiducial identification system based on a physical layout of the containers dispersed throughout the warehouse and associating each container to a fiducial identification corresponding to the physical location of the container in the warehouse.

6. The method of claim 5, wherein the step of associating each container to a fiducial identification further includes linking the fiducial identification of the container to the items.

7. The method of claim 6, wherein the step of determining the set of coordinates representing a position of the fiducial marker with the determined fiducial identification includes correlating the determined fiducial identification with its corresponding fiducial marker and retrieving a set of coordinates representing the position of said fiducial marker in the coordinate system of the warehouse.

8. The method of claim 1, wherein the step of navigating further includes using a predetermined map of the warehouse including a pose for each fiducial marker to guide the robot to the fiducial marker.

9. A robot configured to perform tasks on items located in a space, the items being located proximate fiducial markers, each fiducial marker having a fiducial identification, the robot comprising:

A processor configured to determine a fiducial identification associated with a SKU of at least one item on which the robot is to perform a task; and further configured to obtain, using the fiducial identification of the at least one item, a set of coordinates representing a position of the fiducial marker with the determined fiducial identification, in a coordinate system defined by the space;

A navigation system configured to navigate the robot to the coordinates of the fiducial marker associated with said determined fiducial identification; and wherein the processor is further configured to determine a pose for the fiducial marker within the warehouse and the navigation system is configured to propel the robot to the pose without using intermediate fiducial markers or the fiducial marker correlated to the determined fiducial identification to guide the robot to the pose.

10. The robot of claim 9, further including an interface device configured to communicate with a human operator to perform the task on the at least one item; wherein the task includes one of retrieving the at least one item and placing it on the robot or removing the at least one item from the robot and storing it proximate the fiducial marker.

11. The robot of claim 9, wherein the space is a warehouse containing a plurality of items stored in a plurality of containers dispersed throughout the warehouse.

12. The robot of claim 11, wherein each fiducial marker is associated with and located proximate to one or more of the containers.

13. The robot of claim 12, wherein each container in the warehouse is associated to a fiducial identification corresponding to the physical location of the container in the warehouse.

14. The robot of claim 13, wherein the fiducial identification of the container is linked to the items stored in the containers.

15. The robot of claim 14, wherein the processor is further configured to correlate the determined fiducial identification with its corresponding fiducial marker and retrieve a set of coordinates representing the position of said fiducial marker in the coordinate system of the warehouse.

16. The robot of claim 9, wherein the navigation system includes a map of the warehouse with a pose for each fiducial marker.

* * * * *